United States Patent [19]
McGough

[11] Patent Number: 5,193,113
[45] Date of Patent: Mar. 9, 1993

[54] PROTECTIVE PLATE FOR PAYSTATION ANTI-STUFFING DEVICE

[75] Inventor: Gerald B. McGough, Huntsville, Ala.

[73] Assignee: Quadrum Telecommunications, Inc., Arab, Ala.

[21] Appl. No.: 737,355

[22] Filed: Jul. 29, 1991

[51] Int. Cl.⁵ ............ H04M 17/00; B65G 11/04
[52] U.S. Cl. ............................ 379/437; 379/145; 194/202
[58] Field of Search .......... 379/155, 143, 145, 437, 379/440; 194/202, 204

[56] References Cited
U.S. PATENT DOCUMENTS
3,213,210  10/1965  Samples ........................... 379/143

Primary Examiner—Stafford D. Schreyer
Attorney, Agent, or Firm—Robert J. Black

[57] ABSTRACT

A special cover for the anti-stuffing device door of a paystation telephone coin chute. The cover prevents insertion of large firecrackers or similar devices inside of the anti-stuffing device.

8 Claims, 1 Drawing Sheet

PROTECTIVE PLATE FOR PAYSTATION ANTI-STUFFING DEVICE

BACKGROUND OF THE INVENTION

1. Field of the Invention

The present invention relates to telephone paystations and more particularly to a device for protecting paystations equipped with so-called anti-stuffing devices.

2. Discussion of the Background Art

For more than 60 years unscrupulous individuals have frequently taken advantage of the feature of paystation telephones by obstructing the coin refund chute, preventing the return of coins to the rightful owners when calls have not been successfully completed. The individual who has obstructed the coin refund chute returns at a later time, removes the obstruction and collects the coins that have not been returned properly. Numerous approaches to solution of this problem have taken place over the years. In a background art search directed to the subject matter of the present application in the U.S. Patent and Trademark Office disclosed the following U.S. Pat. Nos.:

| | |
|---|---|
| 1,887,576 | 3,148,246 |
| 1,901,944 | 4,761,809 |
| 2,911,571 | 4,964,095 |
| 3,116,013 | |

Additionally, U.S. Pat. No. 4,660,706, which is assigned to the same assignee as the present application also attempts to deal with this particular problem.

U.S. Pat. No. 1,887,576 teaches the use of a coin control magnet in connection with the return coin chute which includes means to unbalance the coin control magnet upon the insertion of articles with an attempt to block the chute through the opening.

U.S. Pat. No. 1,901,944 also teaches the use of a paystation equipped with a coin disposal magnet and means for actuating the magnet to refund coins deposited in the coin box with additional magnetic means responsive to any unstandard condition within the coin box for causing the magnet to collect any coins deposited in the coin box upon operation of such means.

U.S. Pat. No. 2,922,571 teaches the use of a door having a pivot spaced from the usual coin refund chute for closing the opening, with a frame around an opening for supporting and maintaining the door to register with the opening and a link member pivotally connected to the front door and to the chute whereby the chute is positioned with access there to block by the link to prevent stuffing of the chute when the door is operated.

Yet another approach to solving the problem is taught by U.S. Pat. No. 3,116,013. This patent teaches a return coin housing member in that it has a first opening for receipt of returned coins, a second opening having customer actuated access means, and a third opening providing access to the interior of the main housing. An inner wall member divides the interior of the housing into first and second channels. The lower portion of the housing includes an internally concave bowl portion as a collection point for return coins. The first channel is connected to the bowl portion to the first opening and the second channel is connected to the bowl portion of the third opening. Customer actuated means able to block off the first channel from exterior view and expose the second channel to an exterior view to eliminate the possibility of introducing foreign material to block off said first channel from said bowl portion to provide some measure of protection. The present invention is drawn to provide additional protection for this type of mechanism and will be described hereinafter.

U.S. Pat. No. 3,148,246 provides a technique blocking the coin return chute when the door to the chute is opened to retrieve coins, thus preventing stuffing.

U.S. Pat. No. 4,761,809 also provides a coin return chute similar to that described in U.S. Pat. No. 3,116,013 wherein the throat of the chute is provided with means for inhibiting the stuffing of material into the throat while allowing the passage of coins.

U.S. Pat. No. 4,946,095 is a protection device that prevents stuffing flexible material into the coin return chute by sealing off the chute when the coin return chute is open and prevents stuffing by incorporating a blocking flap in a slot blocking plate, limiting the insertion of flexible material.

U.S. Pat. No. 4,660,706 utilizes a slightly different approach wherein a special door is added to the coin receiver mechanism of a paystation telephone or similar vending machine to discourage the practice of stuffing the mechanism. A slot in the door is normally aligned with the regular slot for coin deposit, or if stuffing occurs, the door slides over misaligning the two slots from preventing deposit of any further coins.

As noted above, a continuing problem in the field of telephone paystations or coin telephones exists in an effort to abscond with deposited coins by stuffing the lead in a coin deposit chute with cloth, paper or similar material into the coin slot. When this is done the coins deposited subsequently are caught behind the stuffing cannot be retrieved by operating the coin release lever. The thief then with a wire or similar instrument pulls out the stuffing or manipulates it so the coins fall into the coin return chute and subsequently pockets the coins. In the design of coin acceptor/rejectors as utilized in those telephones manufactured by the well known telephone manufacturers as well as many of the acceptor/rejectors employed in other coin operated devices, no successful design has been created to overcome the previously outlined problem. The present problem developed after the introduction of so-called "single-slot" paystations. Prior to that the multiple coin slots employed in most coin telephones were not subject to the problem of coin stuffing. Based on the foregoing art it is obvious that single-slot paystations manufactured by AT&T, and followed by others, such as GTE, NT and Quadrum in the years following, have included as an integral portion thereof coin chutes of the type housing an anti-stuffing device wherein the lower hopper, door and chute are combined so that coins may be returned to the customer user. Most anti-stuffing devices made by the above manufacturers and most other manufacturers are of similar design. The term "anti-stuffing device" comes into play because a feature of these mechanisms that resists being backed up with paper or other stuffing materials illegally whereby return of coins to legitimate customers are blocked. Such anti-stuffing devices are not completely effective, particularly in view of the fact it is possible to insert high power firecrackers or similar explosive devices, particularly those firecrackers frequently referred to as "M-80s" which are inserted in the trap door closed with the resultant explosion destroying the anti-stuffing device.

One approach to resolving this particular problem has been to bolt or weld onto the vault door of the telephone paystation a large metal plate which extends to wrap around the housing and also cover the anti-stuffing device. Contained within the plate is a hole for accessing the anti-stuffing device considerably smaller than the anti-stuffing device opening itself. Because the opening of the anti-stuffing device is thus of reduced size, large firecrackers such as the M-80s are too large to be inserted into the anti-stuffing device. Additional benefit of the smaller hole is that the anti-stuffing device is more difficult to stuff. Adequate clearance, however, is embossed into these covers for normal operation of the anti-stuffing device door. While this solution is to some degree effective, it becomes necessary to cover the entire lower housing area of the telephone paystation. Accordingly, there is associated with this the high cost and inconvenience of vault door removal due to excess size and weight. In many cases, complete protection of the entire lower housing area is not really required, with protection for the anti-stuffing device only being necessary. The previous solution if the anti-stuffing device requires change out, vault door and cover removal is also required, which subsequently require the use of the vault door lock key. Another disadvantage exists in that in some types of vaults, attack security is actually weakened due to providing easy pry points.

SUMMARY OF THE INVENTION

The present invention consists of a cover plate and associated stud assembly which is then attached to the front of a modified but otherwise standard anti-stuffing device. The present invention is attached to the anti-stuffing device by means of a threaded stud which protrudes through clearance holes added to the anti-stuffing device door and anti-stuffing device hopper. The hole inserted in the door is made oversize to allow a normal door operation and travel. The nut added to the cover stud completes its assembly to the anti-stuffing device. An embossed section exists in the cover plate to allow normal anti-stuffing device door operation. A small opening exists in the cover plate allowing retrieval of returned coins but is substantially small enough to block the insertion of M-80 firecrackers or similar devices to enhance the anti-stuffing capabilities of the anti-stuffing device. It can be seen that the present invention provides substantial improvement over use of lower housing cover plates because of substantial lower cost providing only protection to the anti-stuffing device.

The inclusion of the present invention also permits normal access to standard weight door removal. With the present invention the normal anti-stuffing device may be removed in the usual manner without access to the vault door and the necessity for utilization of the appropriate lock and key arrangement. Finally, because of no provision of additional pry points, the present invention does not adversely affect vault door security. According to the present approach is effective by providing protection directly to the anti-stuffing device by means of a welded on bolt which protrudes through the anti-stuffing device door and hopper.

DESCRIPTION OF THE PREFERRED EMBODIMENT

Figure 1:
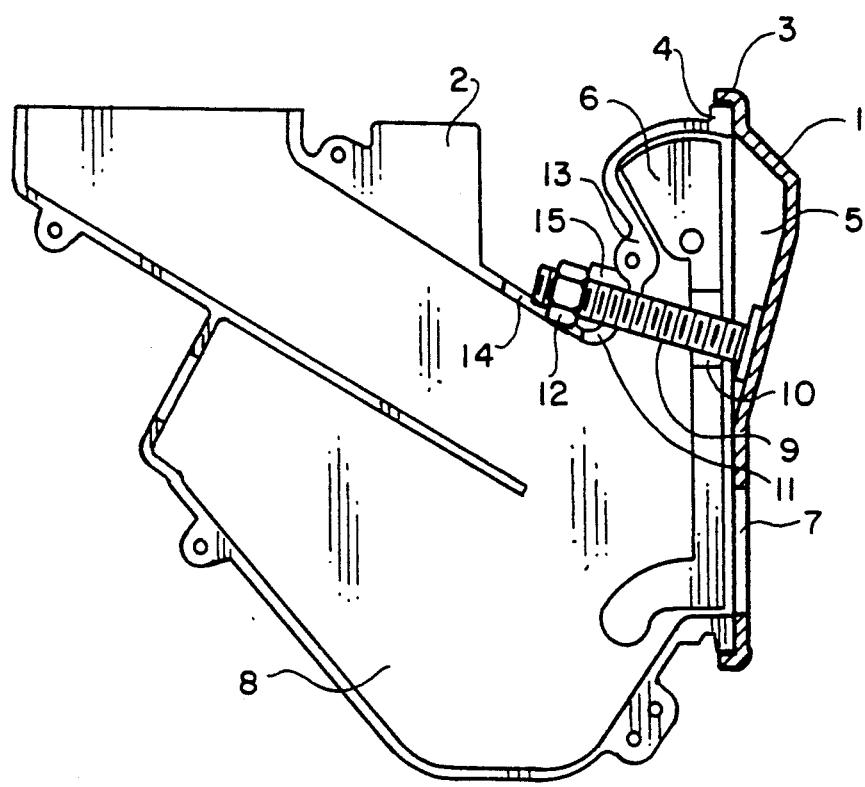
FIG. 1 is a sectional view of the coin return receptacle equipped with an anti-stuffing device and an anti-stuffing device protector in accordance with the present invention.
Figure 2:
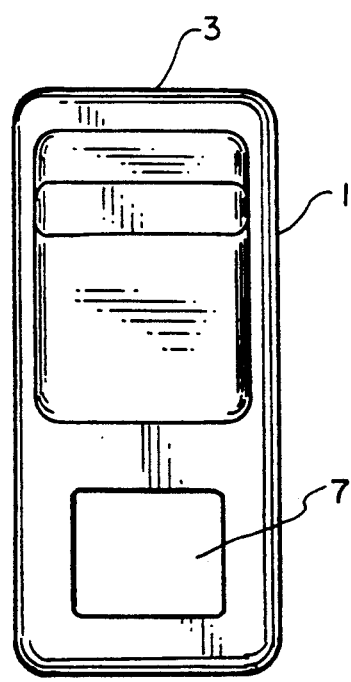
FIG. 2 is a front view of an anti-stuffing device protector in accordance with the present invention.
Figure 3:
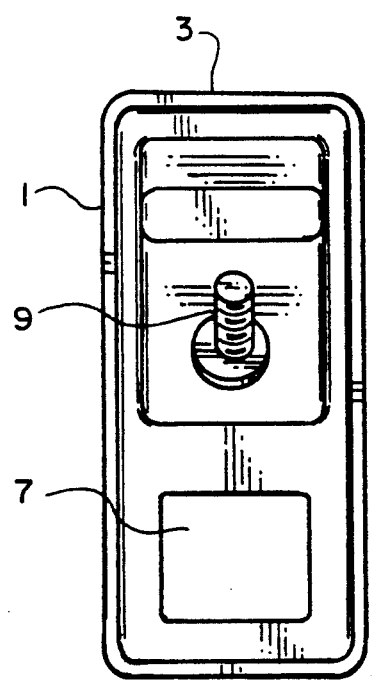
FIG. 3 is a rear view of an anti-stuffing device protector in accordance with the present invention.

Referring now to FIGS. 1, 2 and 3 of the present invention, an anti-stuffing device of the present invention consists primarily of cover 1, which is constructed of stainless steel or similar appropriate material, which is highly resistant to damaging attempts. As may be seen, the cover 1 fits snuggly to and is assembled to the anti-stuffing device assembly 2.

Cover 1 also includes a rim portion 3 which fits snuggly to the perimeter 4 of anti-stuffing device 2. Also contained within cover 1 is embossed or raised section 5 which permits clearance from the rotating top of door 6 of the anti-stuffing device 2. In the lower portion of the cover is opening 7 which permits access to the anti-stuffing device chute portion for retrieving coins from the lower part or hopper 8 of anti-stuffing device 2.

Also included in the anti-stuffing protector in accordance with the present invention is screw 9 which is welded to the cover portion 1 in the bottom portion of the embossed area 5. This screw then protrudes through the anti-stuffing device door 6 at hole 10 which is made oversize in the vertical direction to permit clearance of screw 9 when the anti-stuffing device is rotated. This hole 10 would probably be of an oblong form. The screw 9 also extends through attachment opening 11 of anti-stuffing device 2. This point is secured by means of nut 12.

It will be obvious from the foregoing that the standard anti-stuffing device must be modified by adding clearance hole 10 to door 6 as noted and attachment hole 11 to the anti-stuffing device 2. It is also required to provide additional clearance for mounting nut 12. Thus, a portion of tab 13 of the anti-stuffing device 2 must be partially removed. Additional, hole or opening 14 is added to the top portion of anti-stuffing device 2 to provide space for nut 12 and also to facilitate its insertion or removal.

After nut 12 is positioned on screw 9, the nut is then tightened or torqued down providing a high strength mounting of cover number 1 to properly affect protection for the anti-stuffing device. Proper alignment of anti-stuffing device 2 is also provided by means of spacer 15.

What is claimed is:

1. An anti-stuffing device protector for use with a coin chute of a telephone paystation including an anti-stuffing device including a tiltable door operable to make coins returned via said coin chute accessible by the user of said telephone paystation, said protector for said anti-stuffing device comprising:

a cover portion fitted securely over said door of said anti-stuffing device;

said cover portion including a raised portion adapted to facilitate movement of a portion of said door within said raised portion in response to manual movement of said door by said user of said paystation telephone;

fastening means for securing said cover to said anti-stuffing device.

2. An anti-stuffing device protector as claimed in claim 1 wherein:

said fastening means comprise a screw welded to said cover and secured by means of a nut to said anti-stuffing device.

3. An anti-stuffing device protector as claimed in claim 1 wherein:
   a portion of said cover is embossed to form a substantial space behind said cover;
   whereby said door in response to manual operation may rotate in and about an axis within said space.

4. An anti-stuffing device protector as claimed in claim 1 wherein:
   said cover portion device is constructed of stainless steel.

5. An anti-stuffing device protector as claimed in claim 1 wherein:
   said cover has a rim above the edge of said protector which fits securely over a perimeter of said anti-stuffing device.

6. An anti-stuffing device protector as claimed in claim 1 wherein:
   said door of said anti-stuffing device is modified by adding an elongated hole therethrough to facilitate the placement of said fastening means for securing said cover through said hole whereby connection to said anti-stuffing device can be effected.

7. An anti-stuffing device protector as claimed in claim 6 wherein:
   said fastening means is a screw welded to said cover.

8. An anti-stuffing device protector as claimed in claim 7 wherein:
   said anti-stuffing device is further modified by placing an additional opening to facilitate the placement of said nut on said screw and the tightening of said nut to secure said cover to said anti-stuffing device.

* * * * *